US012638159B1

(12) United States Patent
Prien

(10) Patent No.: US 12,638,159 B1
(45) Date of Patent: May 26, 2026

(54) RECESSED LIGHT FIXTURE WITH AN AUTO-ALIGNING MAGNETIC MOUNTING ACCESSORY

(71) Applicant: AURALYTE, LLC, Providence, RI (US)

(72) Inventor: Christopher Prien, Providence, RI (US)

( * ) Notice: Subject to any disclaimer, the term of this patent is extended or adjusted under 35 U.S.C. 154(b) by 0 days.

(21) Appl. No.: 19/298,389

(22) Filed: Aug. 13, 2025

Related U.S. Application Data

(63) Continuation-in-part of application No. 18/894,248, filed on Sep. 24, 2024, now abandoned.

(51) Int. Cl.
*F21V 17/10* (2006.01)
*F21S 8/02* (2006.01)
*F21V 17/00* (2006.01)
*F21V 21/04* (2006.01)

(52) U.S. Cl.
CPC ............ *F21V 17/105* (2013.01); *F21S 8/026* (2013.01); *F21V 17/005* (2013.01); *F21V 21/04* (2013.01)

(58) Field of Classification Search
CPC ...... F21V 17/105; F21V 17/005; F21V 21/04; F21S 8/026
USPC .......................................................... 362/398
See application file for complete search history.

(56) References Cited

U.S. PATENT DOCUMENTS 4,449,168 A 5/1984 Ewing
7,549,779 B2 6/2009 Genenbacher
8,454,204 B1 * 6/2013 Chang ..................... F21V 7/041 362/257
9,318,886 B1 4/2016 Pate
9,557,021 B2 * 1/2017 Madden .................. F21V 29/70
10,041,638 B2 * 8/2018 Vasquez ................ F21V 29/773
10,520,172 B2 12/2019 Moon
D925,109 S 7/2021 Danesh
11,674,649 B2 * 6/2023 David ..................... F21V 17/06 362/147
11,703,196 B2 7/2023 Fierman
2005/0265016 A1 * 12/2005 Rappaport ............ F21V 17/105 362/147
2006/0221620 A1 10/2006 Thomas
2017/0368677 A1 12/2017 Rotenberg
2024/0328607 A1 * 10/2024 Huang .................... F21V 23/04

FOREIGN PATENT DOCUMENTS

CA 3035032 8/2019

* cited by examiner

*Primary Examiner* — Laura K Tso
(74) *Attorney, Agent, or Firm* — Kyle A. Fletcher, Esq.

(57) ABSTRACT

The recessed light fixture with an auto-aligning magnetic mounting accessory is a lamp. The recessed light fixture mounts in a ceiling structure. The recessed light fixture is adapted for use with a decorative accessory. The decorative accessory removably attaches to the recessed light fixture. The decorative accessory magnetically attaches to the recessed light fixture. The recessed light fixture comprises a lamp structure, a plurality of magnets, and a mount structure. The mount structure and the plurality of magnets attach to the lamp structure. The mount structure secures the recessed light fixture to the ceiling structure. The plurality of magnets attach the decorative accessory to the lamp structure. The lamp structure and the decorative accessory may comprise an alignment mechanism.

20 Claims, 5 Drawing Sheets

RECESSED LIGHT FIXTURE WITH AN AUTO-ALIGNING MAGNETIC MOUNTING ACCESSORY

CROSS REFERENCES TO RELATED APPLICATIONS

This application claims the benefit of the filing date of application Ser. No. 18/894,248, filed on Sep. 24, 2024 in the United States, and of Application No. PCT/US25/15324, filed on Feb. 11, 2025 in the United States, both of which are incorporated by reference herein in their entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of recessed lighting and auto-aligning magnetic mounts, more specifically, a recessed light fixture with an auto-aligning magnetic mounting accessory.

SUMMARY OF INVENTION

The recessed light fixture with an auto-aligning magnetic mounting accessory is a lamp. The recessed light fixture mounts in a ceiling structure. The recessed light fixture is adapted for use with a decorative accessory. The decorative accessory removably attaches to the recessed light fixture. The decorative accessory magnetically attaches to the recessed light fixture. The recessed light fixture comprises a lamp structure, a plurality of magnets, and a mount structure. The mount structure and the plurality of magnets attach to the lamp structure. The mount structure secures the recessed light fixture to the ceiling structure. The plurality of magnets attach the decorative accessory to the lamp structure. The lamp structure and the decorative accessory may comprise an alignment mechanism.

An object of the invention is to provide a recessed light fixture and a decorative accessory.

Another object of the invention is to couple the decorative accessory to the recessed light fixture magnetically.

A further object of the invention is to provide an alignment ring on the top of the decorative accessory such that the alignment ring may align the decorative accessory with a portion of the recessed light.

Yet another object of the invention is to provide a first plurality of alignment apertures located on the recessed light, a second plurality of alignment apertures located on the decorative accessory, and a plurality of alignment pins that may prevent rotation and/or separation of the decorative accessory and the recessed light.

These together with additional objects, features and advantages of the recessed light fixture with an auto-aligning magnetic mounting accessory will be readily apparent to those of ordinary skill in the art upon reading the following detailed description of the presently preferred, but nonetheless illustrative, embodiments when taken in conjunction with the accompanying drawings.

In this respect, before explaining the current embodiments of the recessed light fixture with an auto-aligning magnetic mounting accessory in detail, it is to be understood that the recessed light fixture with an auto-aligning magnetic mounting accessory is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the recessed light fixture with an auto-aligning magnetic mounting accessory.

It is therefore important that the claims be regarded as including such equivalent construction insofar as they do not depart from the spirit and scope of the recessed light fixture with an auto-aligning magnetic mounting accessory. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
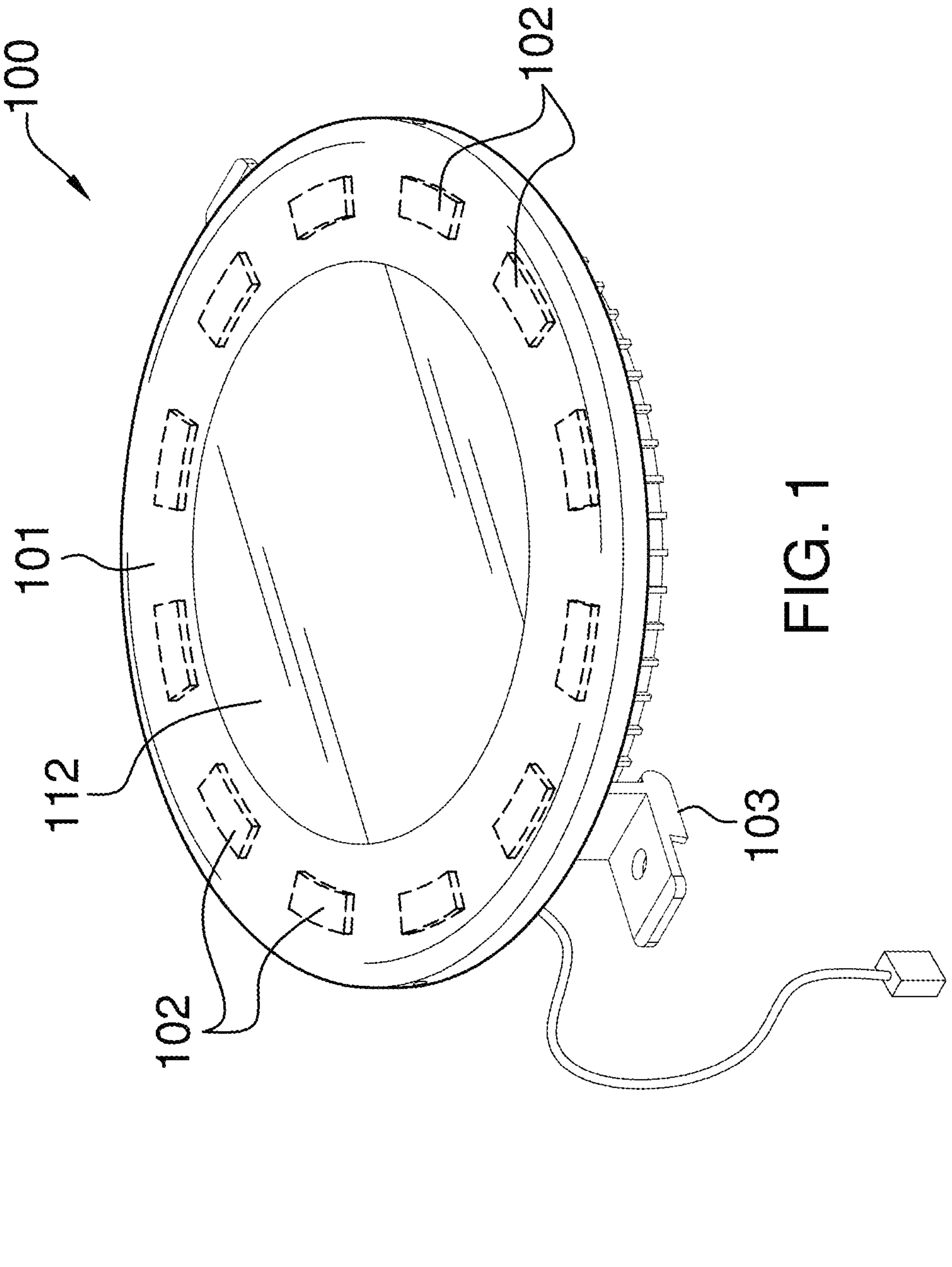
FIG. 1 is an isometric view of an embodiment of the disclosure.
Figure 2:
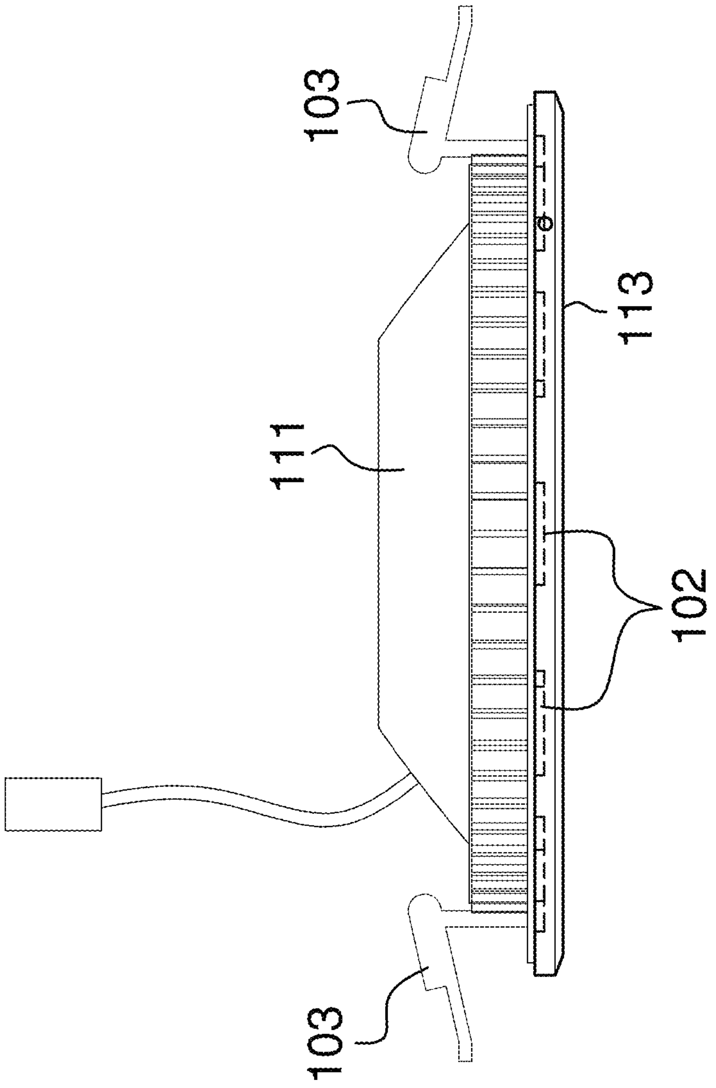
FIG. 2 is a side view of an embodiment of the disclosure.
Figure 3:
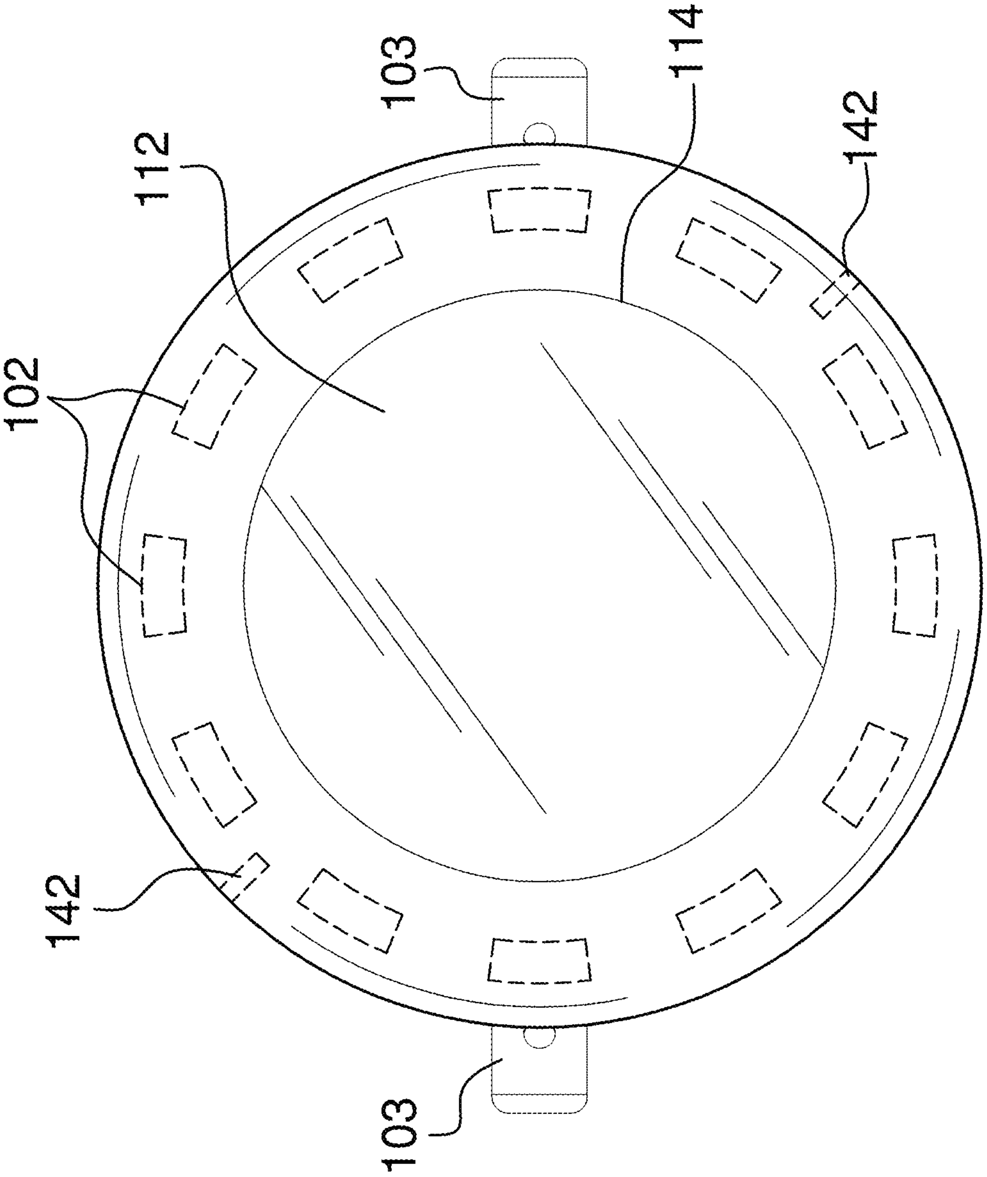
FIG. 3 is a top view of an embodiment of the disclosure.
Figure 4:
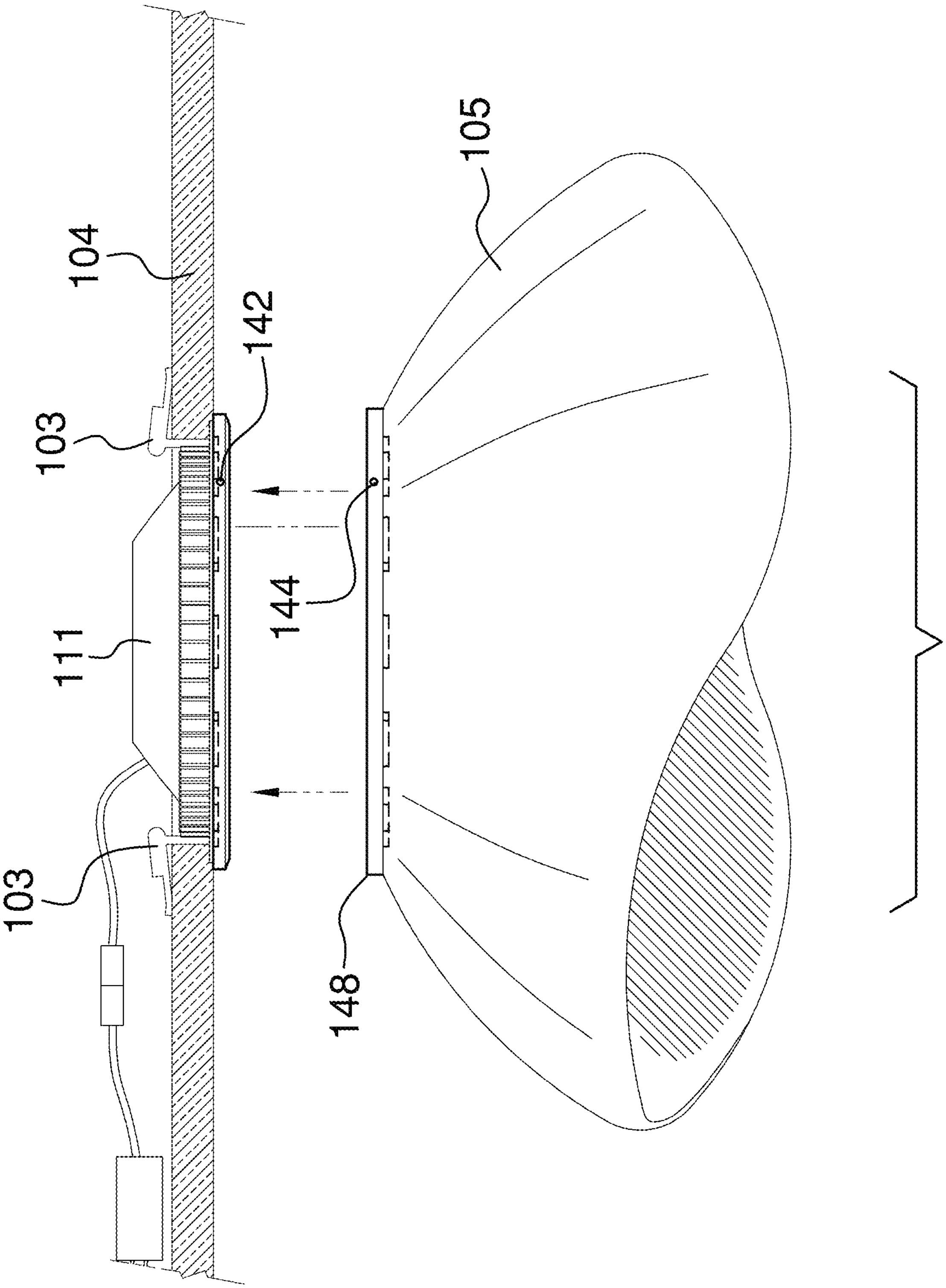
FIG. 4 is an in-use view of an embodiment of the disclosure.
Figure 5:
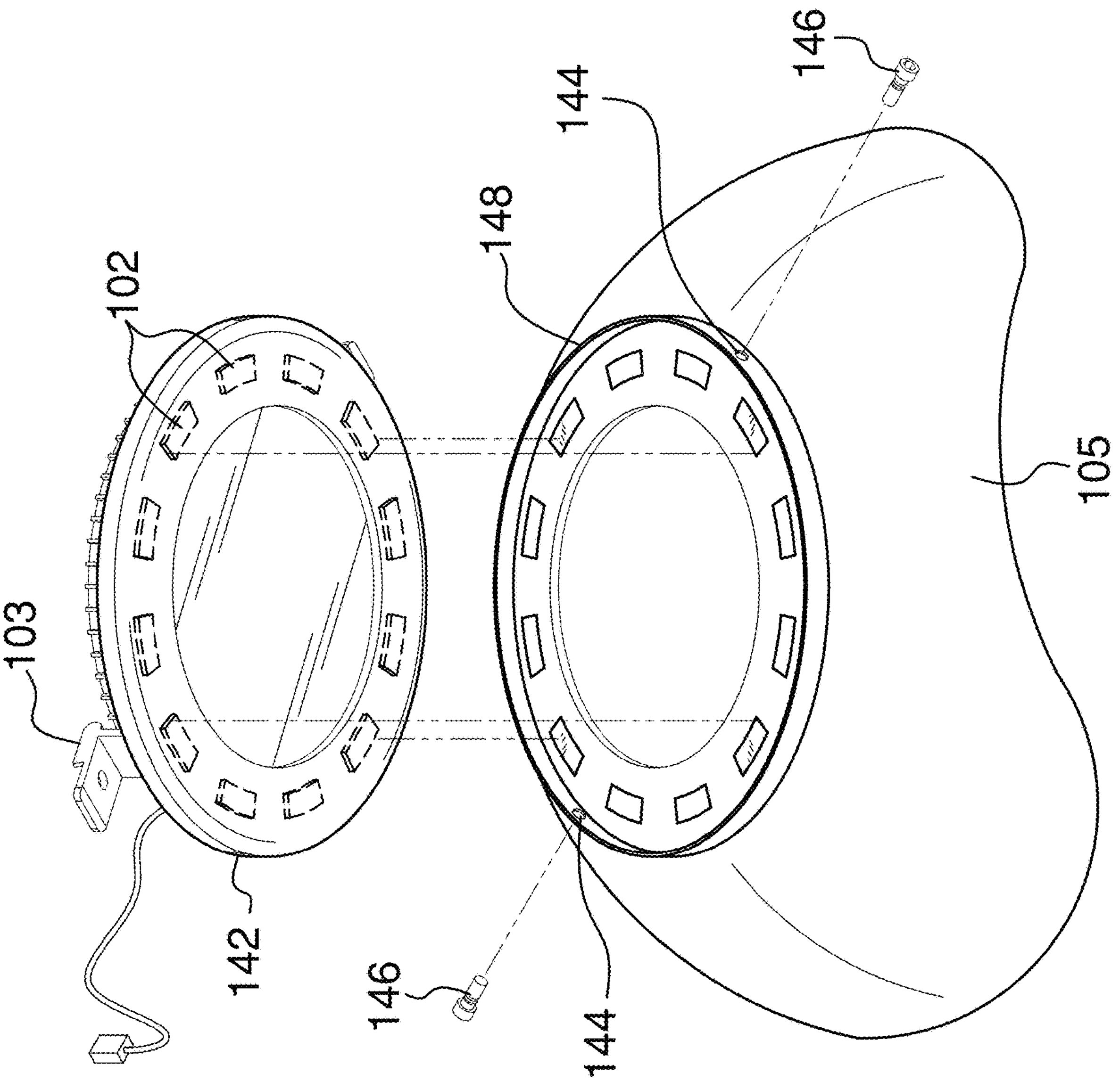
FIG. 5 is an exploded isometric view of an embodiment of the disclosure.

Detailed reference will now be made to a first potential embodiment of the disclosure, which is illustrated in FIGS. 1 through 5.

The recessed light fixture with an auto-aligning magnetic mounting accessory 100 (hereinafter invention) is a lamp.

The invention 100 mounts in a ceiling structure 104. The invention 100 is adapted for use with a decorative accessory 105. The decorative accessory 105 removably attaches to the invention 100. The decorative accessory 105 magnetically attaches to the invention 100. The invention 100 comprises a lamp structure 101, a plurality of magnets 102, and a mount structure 103. The mount structure 103 and the plurality of magnets 102 attach to the lamp structure 101. The mount structure 103 secures the invention 100 to the ceiling structure 104. The plurality of magnets 102 attach the decorative accessory 105 to the lamp structure 101. The lamp structure 101 and the decorative accessory 105 may comprise an alignment mechanism.

The decorative accessory 105 is a decorative structure. The decorative accessory 105 magnetically attaches to the lamp structure 101. The decorative accessory 105 filters the hue of the electromagnetic radiation that is generated by the lamp structure 101. The decorative accessory 105 redirects the path of the electromagnetic radiation generated by the lamp structure 101. The decorative accessory 105 reflects a portion of the electromagnetic radiation generated by the lamp structure 101 into the field of illumination.

The ceiling structure 104 forms the superior surface of a chamber that is illuminated by the lamp structure 101. The ceiling structure 104 forms the structure that receives the load of the invention 100. The ceiling structure 104 mechanically attaches to the mount structure 103. The ceiling structure 104 receives the load of the invention 100 through the mount structure 103. The ceiling structure 104 is formed with the apertures necessary to allow the electromagnetic radiation generated by the lamp structure 101 to illuminate a field of view within the chamber.

The lamp structure 101 is an electric circuit. The lamp structure 101 converts electric energy into electromagnetic radiation. The electromagnetic radiation generated by the lamp structure 101 is in the visible light spectrum. The lamp structure 101 forms a recessed structure that mounts in the ceiling structure 104. The lamp structure 101 comprises a lamp/housing structure 111, a lamp face 112, and a lamp ring structure 113. The lamp ring structure 113 further comprises a lamp characteristic aperture 114.

The plurality of magnets 102 forms a fastening device. The plurality of magnets 102 removably attaches the decorative accessory 105 to the lamp structure 101. The plurality of magnets 102 magnetically attaches the decorative accessory 105 to the lamp structure 101. Each magnet selected from the plurality of magnets 102 mounts on the exterior surface of the lamp ring structure 113 of the lamp structure 101. The plurality of magnets 102 are evenly distributed around the face of the lamp ring structure 113. The plurality of magnets 102 transfers the load of the decorative accessory 105 to the mount structure through the lamp/housing structure 111 of the lamp structure 101.

The mount structure 103 is a mechanical structure. The mount structure 103 is a load bearing structure. The mount structure 103 attaches to the lamp/housing structure 111 of the lamp structure 101. The mount structure 103 transfers the load of the lamp/housing structure 111 to an external load path accessed through the ceiling structure 104.

The lamp/housing structure 111 forms the lamp of the invention 100. The lamp/housing structure 111 is a lamp circuit that is enclosed within a protected space formed by a housing structure. The lamp/housing structure 111 receives electric energy from an externally provided source. The lamp/housing structure 111 converts the received electric energy into an electromagnetic radiation. The electromagnetic radiation generated by the lamp/housing structure 111 is used to illuminate a field of illumination. The electromagnetic radiation generated by the lamp/housing structure 111 is discharged through the lamp face 112 into the field of illumination.

The lamp face 112 is a semitransparent structure. The lamp face 112 forms the structure of the lamp structure 101 that directs the electromagnetic radiation generated by the lamp structure 101 into the field of illumination. The lamp face 112 is sized such that the lamp face 112 fits into the lamp characteristic aperture 114 of the lamp ring structure 113.

The lamp ring structure 113 is a disk-shaped structure. The lamp ring structure 113 forms a ring. The lamp characteristic aperture 114 is the negative space that is characteristic of a ring structure. The lamp characteristic aperture 114 forms the structure of the lamp ring structure 113 the lamp face 112 inserts into. The electromagnetic radiation discharged by the lamp/housing structure 111 through the lamp face 112 passes through the lamp characteristic aperture 114. The lamp ring structure 113 forms a boundary that encloses any open space that exists between the ceiling structure 104 and the lamp face 112.

The alignment mechanism may aid in aligning the decorative accessory 105 with the lamp structure 101. The alignment mechanism may comprise a rigid alignment ring 148 located on the decorative accessory 105, a first plurality of alignment apertures 142 located on the lamp structure 101, a second plurality of alignment apertures 144 located on the decorative accessory 105, and a plurality of alignment pins 146. The rigid alignment ring 148 may encompass the top of the decorative accessory 105 and may extend above the decorative accessory 105. The inside diameter of the rigid alignment ring 148 may conform to the outside diameter of the lamp structure 101 such that the rigid alignment ring 148 may slide onto the lamp structure 101 guided by the rigid alignment ring 148. The decorative accessory 105 may be rotated to align the first plurality of alignment apertures 142 with the second plurality of alignment apertures 144 and the plurality of alignment pins 146 may be inserted through the first plurality of alignment apertures 142 and the second plurality of alignment apertures 144. The plurality of alignment pins 146 and the first plurality of alignment apertures 142 may be threaded such that the plurality of alignment pins 146 may be screwed into the decorative accessory to retain the plurality of alignment pins 146. In a preferred embodiment, there may be two alignment apertures on the decorative accessory 105 and on the lamp structure 101.

In use, the lamp structure 101 may be coupled to a ceiling structure 104 using the mount structure 103 and may be electrically coupled to an electrical circuit.

The decorative accessory 105 may be coupled to the lamp structure 101 by aligning the rigid alignment ring 148 on the top of the decorative accessory 105 with the exposed edge of the lamp structure 101 and lifting the decorative accessory 105 onto the lamp structure 101. The plurality of magnets 102 may retain the decorative accessory 105 to the lamp structure 101. The decorative accessory 105 may be rotated to align the first plurality of alignment apertures 142 located on the lamp structure 101 with the second plurality of alignment apertures 144 located on the decorative accessory 105. The plurality of alignment pins 146 may then be inserted through the first plurality of alignment apertures 142 and the second plurality of alignment apertures 144 and screwed in to lock the decorative accessory 105 in place.

DEFINITIONS

Unless otherwise stated, the words “up”, “down”, “top”, “bottom”, “upper”, and “lower” should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface or object. Aperture may be synonymous with hole, slit, crack, gap, slot, or opening.

As used herein, the words "couple", "couples", "coupled" or "coupling", may refer to connecting, either directly or indirectly, and does not necessarily imply a mechanical connection.

As used in this disclosure, "decorative" may be an adjective that refers to a first object or item that is used with a second object or item of the purpose of making the second object or item more attractive and/or more distinct. Decorative will generally, but not necessarily, imply making the second object or item more attractive visually.

As used in this disclosure, the word "exterior" may be used as a relational term that implies that an object is not located or contained within the boundary of a structure or a space.

As used in this disclosure, a "field of view" may refer to one or more angles that delimit an area from which electromagnetic radiation will be sensed by a person or an image sensor.

As used in this disclosure, a "housing" may be a rigid or semi-rigid casing that encloses and protects one or more devices.

As used herein, "inside diameter" or "inner diameter" may refer to a measurement made on a hollow object. Specifically, the inside diameter is the distance from one inside wall to the opposite inside wall.

As used in this disclosure, a "magnet" may be an ore, alloy, or other material that has its component atoms arranged so that the material exhibits properties of magnetism such as attracting iron-containing objects or aligning itself in an external magnetic field.

As used herein, "mount" may refer to a mechanical structure that attaches a first object to a second object or that incorporates a first object into a second object.

As used in this disclosure, "negative space" may be a method of defining an object through the use of open or empty space as the definition of the object itself, or, through the use of open or empty space to describe the boundaries of an object.

As used herein, "outside diameter" or "outer diameter" may refer to a measurement made on an object. Specifically, the outside diameter is the distance from one point on the outside of the object to a point on the opposite side of the object along a line passing through the center of the object.

As used herein, "portion" may refer to something less than the whole in cases where the exact percentage of the whole comprising the portion is not critical to operation.

As used herein, "rigid" may refer to an object or material which is inflexible.

As used in this disclosure, "semitransparent" may refer to an object that is partially transparent.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A recessed light fixture with an auto-aligning magnetic mounting accessory comprising;

a lamp structure that is configured to mount in a ceiling structure;

a decorative accessory is magnetically attached to the lamp structure with an alignment mechanism;

wherein the alignment mechanism utilizes at least one pin that is aligned with at least one alignment apertures in order to secure the decorative accessory to the lamp structure.

2. The recessed light fixture with an auto-aligning magnetic mounting accessory according to claim 1 further comprising:

a plurality of magnets, and a mount structure;

wherein the mount structure and the plurality of magnets attach to the lamp structure;

wherein the mount structure secures the recessed light fixture with the auto-aligning magnetic mounting accessory to the ceiling structure;

wherein the plurality of magnets attach the decorative accessory to the lamp structure.

3. The recessed light fixture with an auto-aligning magnetic mounting accessory according to claim 2 wherein the decorative accessory filters the hue of the electromagnetic radiation that is generated by the lamp structure;

wherein the decorative accessory redirects the path of the electromagnetic radiation generated by the lamp structure;

wherein the decorative accessory reflects a portion of the electromagnetic radiation generated by the lamp structure into a field of illumination.

4. The recessed light fixture with an auto-aligning magnetic mounting accessory according to claim 3 wherein the ceiling structure forms a superior surface of a chamber that is illuminated by the lamp structure;

wherein the ceiling structure forms the structure that receives a load of the recessed light fixture with an auto-aligning magnetic mounting accessory;

wherein the ceiling structure mechanically attaches to the mount structure;

wherein the ceiling structure receives the load of the recessed light fixture with an auto-aligning magnetic mounting accessory through the mount structure;

wherein the ceiling structure is formed with apertures necessary to allow the electromagnetic radiation generated by the lamp structure to illuminate a field of view within the chamber.

5. The recessed light fixture with an auto-aligning magnetic mounting accessory according to claim 4 wherein the lamp structure converts electric energy into electromagnetic radiation.

6. The recessed light fixture with an auto-aligning magnetic mounting accessory according to claim 5 wherein the lamp structure forms a recessed structure that mounts in the ceiling structure;

wherein the lamp structure comprises a lamp housing, a lamp face, and a lamp ring structure;

wherein the lamp ring structure further comprises a lamp characteristic aperture.

7. The recessed light fixture with an auto-aligning magnetic mounting accessory according to claim 6 wherein the plurality of magnets forms a fastening device;

wherein the plurality of magnets removably attaches the decorative accessory to the lamp structure;

wherein the plurality of magnets magnetically attaches the decorative accessory to the lamp structure;

wherein each magnet selected from the plurality of magnets mounts on the exterior surface of the lamp ring structure of the lamp structure;

wherein the plurality of magnets are evenly distributed around the face of the lamp ring structure;

wherein the plurality of magnets transfers the load of the decorative accessory to the mount structure through the lamp housing of the lamp structure.

8. The recessed light fixture with an auto-aligning magnetic mounting accessory according to claim 7 wherein the mount structure is a mechanical structure;

wherein the mount structure is a load bearing structure;

wherein the mount structure attaches to the lamp housing of the lamp structure;

wherein the mount structure transfers the load of the lamp housing to an external load path accessed through the ceiling structure.

9. The recessed light fixture with an auto-aligning magnetic mounting accessory according to claim 8 wherein the lamp housing forms the lamp of the recessed light fixture with an auto-aligning magnetic mounting accessory;

wherein the structure lamp housing is a lamp circuit that is enclosed within a protected space formed by a housing structure;

wherein the structure lamp housing receives electric energy from an externally provided source;

wherein the structure lamp housing converts the received electric energy into an electromagnetic radiation;

wherein the electromagnetic radiation generated by the lamp housing is used to illuminate a field of illumination;

wherein the electromagnetic radiation generated by the lamp housing is discharged through the lamp face into the field of illumination.

10. The recessed light fixture with an auto-aligning magnetic mounting accessory according to claim 9 wherein the lamp face is a semitransparent structure;

wherein the lamp face forms the structure of the lamp structure that directs the electromagnetic radiation generated by the lamp structure into the field of illumination;

wherein the lamp face is sized such that the lamp face fits into the lamp characteristic aperture of the lamp ring structure.

11. The recessed light fixture with an auto-aligning magnetic mounting accessory according to claim 10 wherein the lamp ring structure is a disk-shaped structure;

wherein the lamp ring structure forms a ring;

wherein the lamp characteristic aperture is the negative space that is characteristic of a ring structure;

wherein the lamp characteristic aperture forms the structure of the lamp ring structure the lamp face inserts into;

wherein the electromagnetic radiation discharged by the lamp housing through the lamp face passes through the lamp characteristic aperture;

wherein the lamp ring structure forms a boundary that encloses any open space that exists between the ceiling structure and the lamp face.

12. The recessed light fixture with an auto-aligning magnetic mounting accessory according to claim 11 wherein the alignment mechanism aids in aligning the decorative accessory with the lamp structure;

wherein the alignment mechanism comprises a rigid alignment ring located on the decorative accessory, a first plurality of alignment apertures located on the lamp structure, a second plurality of alignment apertures located on the decorative accessory, and a plurality of alignment pins;

wherein the rigid alignment ring encompasses a top of the decorative accessory and extends above the decorative accessory.

13. The recessed light fixture with an auto-aligning magnetic mounting accessory according to claim 12 wherein the inside diameter of the rigid alignment ring conforms to an outside diameter of the lamp structure such that the rigid alignment ring slides onto the lamp structure guided by the rigid alignment ring.

14. The recessed light fixture with an auto-aligning magnetic mounting accessory according to claim 13 wherein the decorative accessory is rotated to align the first plurality of alignment apertures with the second plurality of alignment apertures and the plurality of alignment pins are inserted through the first plurality of alignment apertures and the second plurality of alignment apertures.

15. The recessed light fixture with an auto-aligning magnetic mounting accessory according to claim 14 wherein the plurality of alignment pins and the first plurality of alignment apertures are threaded such that the plurality of alignment pins screw into the decorative accessory to retain the plurality of alignment pins.

16. The recessed light fixture with an auto-aligning magnetic mounting accessory according to claim 15 wherein there are two alignment apertures on the decorative accessory and on the lamp structure.

17. A recessed light fixture with an auto-aligning magnetic mounting accessory comprising;

a lamp structure that is configured to mount in a ceiling structure;

a decorative accessory is magnetically attached to the lamp structure with an alignment mechanism;

wherein the alignment mechanism utilizes at least one pin that is aligned with at least one alignment apertures in order to secure the decorative accessory to the lamp structure;

wherein the alignment mechanism aids in aligning the decorative accessory with the lamp structure.

18. The recessed light fixture with an auto-aligning magnetic mounting accessory according to claim 17 further comprising:

a plurality of magnets, and a mount structure;

wherein the mount structure and the plurality of magnets attach to the lamp structure;

wherein the mount structure secures the recessed light fixture with the auto-aligning magnetic mounting accessory to the ceiling structure;

wherein the plurality of magnets attach the decorative accessory to the lamp structure;

wherein the lamp structure and the decorative accessory comprises an alignment mechanism.

19. The recessed light fixture with an auto-aligning magnetic mounting accessory according to claim 18 wherein the alignment mechanism comprises a rigid alignment ring located on the decorative accessory, a first plurality of alignment apertures located on the lamp structure, a second plurality of alignment apertures located on the decorative accessory, and a plurality of alignment pins;

wherein the rigid alignment ring encompasses the top of the decorative accessory and extends above the decorative accessory.

20. The recessed light fixture with an auto-aligning magnetic mounting accessory according to claim 19 wherein the decorative accessory is rotated to align the first plurality of alignment apertures with the second plurality of alignment apertures and the plurality of alignment pins are inserted through the first plurality of alignment apertures and the second plurality of alignment apertures;

wherein the plurality of alignment pins and the first plurality of alignment apertures are threaded such that the plurality of alignment pins screw into the decorative accessory to retain the plurality of alignment pins.

* * * * *